(12) United States Patent
Berelovich et al.

(10) Patent No.: US 6,646,634 B2
(45) Date of Patent: Nov. 11, 2003

(54) TOUCH PANEL COORDINATE DETERMINATION

(75) Inventors: Alex Berelovich, Pleasanton, CA (US); John F. Schipper, Palo Alto, CA (US); Jae H. Shim, San Jose, CA (US); Ilwhan Park, Pleasanton, CA (US)

(73) Assignee: Mobigence, Inc., San Jose, CA (US)

( * ) Notice: Subject to any disclaimer, the term of this patent is extended or adjusted under 35 U.S.C. 154(b) by 442 days.

(21) Appl. No.: 09/775,388

(22) Filed: Jan. 31, 2001

(65) Prior Publication Data

US 2002/0101407 A1 Aug. 1, 2002

(51) Int. Cl.[7] ................................................ G09G 5/00
(52) U.S. Cl. ................................ 345/174; 178/18.05
(58) Field of Search ............................... 345/173, 174, 345/177; 178/18.01, 18.05, 18.06, 18.07, 18.1

(56) References Cited

U.S. PATENT DOCUMENTS 4,886,943 A  * 12/1989  Suzuki et al. ............ 178/18.04
5,670,755 A  * 9/1997  Kwon ....................... 178/18.05
5,841,078 A  * 11/1998  Miller et al. ............. 178/18.06
6,483,498 B1 * 11/2002  Colgan et al. ............. 345/173
6,549,193 B1 * 4/2003  Huang et al. .............. 345/173

* cited by examiner

Primary Examiner—Kent Chang
(74) Attorney, Agent, or Firm—John F. Schipper

(57) ABSTRACT

Method and system for determining (x,y) location coordinates for a contact point on a touch sensitive panel or input screen. Selected, substantially constant voltages are provided for two electrodes that are part of the input screen, from one voltage source. A current value is measured for one resistive line segment that extends from the contact point to one of the electrodes, and the voltage at the contact point is measured. Resistance values for at least two of the four resistive lines that extend from the contact point to the electrodes are calculated or estimated, and (x,y) location coordinates are estimated for the contact point from these resistance values. The invention uses two measurements and two non-switched voltage sources to provide the (x,y) coordinates.

28 Claims, 5 Drawing Sheets

TOUCH PANEL COORDINATE DETERMINATION

FIELD OF THE INVENTION

This invention relates to touch sensitive panels used in electronic devices, such as computers, hand held PDAs and radiotelephones.

BACKGROUND OF THE INVENTION

Touch sensitive panels, referred to as "input screens" herein, are widely used for hand held devices, including personal digital assistants (PDAs), radiotelephones and other hand held wireless devices. An input screen with a resistive overlay (e.g., indium tin oxide) includes upper and lower transparent input layers positioned above a display screen, where each input layer includes two electrodes and a sequence of parallel electrically resistive paths between the two electrodes. When a user uses a stylus or other appendage to touch the input screen at a selected location, the upper and lower input layers contact each other, generating a signal that identifies an x-coordinate (horizontal) and a y-coordinate (vertical) for the contact point (touched location) relative to the display screen image. A conventional input screen requires at least four wires, one for each electrode, to transfer location information signals from electrode to a signal processor that analyzes these signals. A conventional input screen will group all four wires as a unit and will route the wires along several edges of the input screen to the appropriate electrode. The device usually has one relatively inflexible tail that includes the four wires. This tail is usually bulky and requires provision of additional room around the input screen in which to fit the tail.

One result of this approach is that presence of the tail requires provision of a relatively large, non-usable, referred to herein as a "routing zone", on one or two sides of the four sides of the input screen, to provide room for the tail. A second result of this approach is that the portion of the device housing that surrounds the input screen is non-symmetric, being noticeably wider on one or two sides than on the opposite side(s). A third result is that the key area or active area (bounded by the four electrodes; the region where the alphanumeric characters and graphics appear on the display screen) is reduced substantially, often by as much as 10–14 percent, relative to the input screen key area that would be available if the four-wire tail were not present. A fourth result of this approach is that the tail, when received within the device housing, is relatively inflexible and cannot be easily reconfigured to fit into the routing zone for wiring of the input screen and other components.

Many of the input screen systems rely on alternatingly switching off (isolating) and switching on one of the two pairs of opposed electrodes, in order to estimate the currents present at the input screen contact point. An example of this approach is disclosed in U.S. Pat. No. 4,293,734, issued to Pepper and incorporated by reference herein. Provision of electrode switching requires more complexity in the signal processor and associated hardware used to estimate the (x,y) coordinates of the input screen contact point. Electrode switching also requires that the electronics system be allowed to re-settle (in a time estimated to be $\mu$sec to msec) before another current measurement may be taken.

What is needed is an approach that (1) does not require switching of electrodes in order to determine the (x,y) coordinates of the input screen contact point, (2) does not require provision of a settling time before one or more current measurements can be made, (3) has a simpler construction than man of the prior art input screen systems, (4) allows use of arbitrary resistance values for the resistive lines used on each of the upper and lower input layers, (5) allows use of two wires, three wires or four wires connecting the electrodes and upper and lower input layers to a signal processor used to determine the contact point coordinates, (6) allows an increase in the size of the input screen key area or active area, (7) allows a reduction in one or more dimensions of a hand held computing device that employs this input screen system, and (8) allows the key area to appear in a symmetric and more pleasing arrangement as part of the device housing.

SUMMARY OF THE INVENTION

These needs are met by the invention, which provides a method and system for providing a input screen in which a current and a voltage, or two currents, are measured adjacent to electrodes or other electrical contact points having substantially constant (unswitched) voltages. Resistance values associated with two resistive line segments that extend from an input screen contact point to the four electrodes are then determined, and (x,y) coordinates for the contact point are determined. Electrode voltage switching is not performed, and the total number of wires required to be connected to the input layers is three, including two wires that provide voltages for the electrodes. The total resistance value for resistive lines extending from one electrode to an opposed electrode is arbitrarily chosen.

One benefit of this invention is simplicity: no voltage switching is required, and hence no voltage and current settling times need be provided. Another simplification is use of three wires: the routing surrounding the input screen key area is smaller, the size of the input screen key area can be made larger, one or more dimensions (length and/or width) of the device housing for a hand held computing device with input screen can be reduced without increasing another dimension, and the key area may have a symmetric and more pleasing arrangement relative to the remainder of the device housing. The software and/or firmware used by the signal processor to determine the (x,y) coordinates of the input screen contact point is somewhat more complex, but the computations need only be done once for each new contact point chosen.

In a first embodiment, the resistive lines in each of the first and second input layers are connected at a first end to a selected voltage source and are allowed to "float" at a second end. The resistive lines for the second input layer are connected across a selected resistor to the second voltage source, which may be ground or some other selected voltage value. This embodiment requires only two electrodes, not four. A current is measured from the first input layer electrode to an electrical contact point, where a resistive line from each of the first and second input layers contact each other, as a result of touching the screen with a stylus, finger or other appendage. Voltage at the contact point is also measured. From these two measurements, the resistance value for each of the two resistive line segments (horizontal and vertical) that connect the contact point to the voltage source for that input layer are calculated, and the corresponding (x,y) coordinates for the contact point are determined.

In a second embodiment, the resistive lines in each input layer are connected between a first voltage source and a second (lower) voltage source. The contact point voltage and a current in one of the four resistive line segments (between a voltage source and the contact point) are measured. From these two measurements, the resistance value for each of two resistive line segments (horizontal and vertical) that connect the contact point to a voltage source are calculated, and the corresponding (x,y) coordinates for the contact point are determined. Each of these two embodiments requires a current measurement, a voltage measurement and a wire for each of two voltage sources.

DESCRIPTION OF BEST MODES OF THE INVENTION

Figure 1:
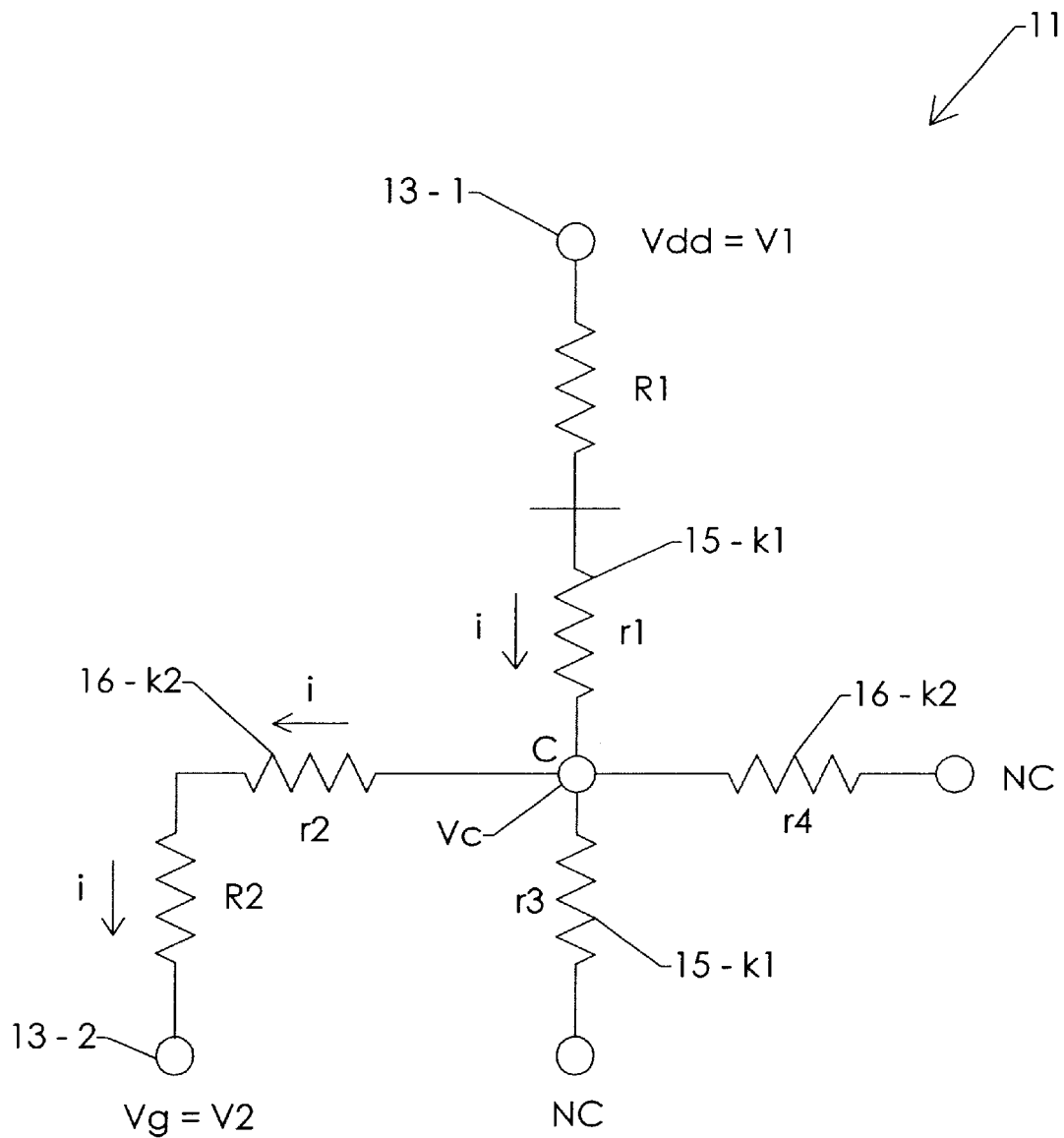
FIGS. 1, 2, 3 and 4 are schematic views of input screen systems suitable for practising the invention.

FIG. 1 schematically illustrates components of an input screen system 11 suitable for practising the invention. The system 11 illustrated in FIG. 1 includes two electrodes, 13-j (j=1, 2), maintained at selected voltages Vj, where it is assumed without loss of generality that $V1=V_{dd}>V2=V_g$, where $V_g$ may be, but need not be, a ground voltage. The system 11 also includes two input layers, 15 (upper) and 16 (lower), not explicitly shown in FIG. 1, parallel to and separated from each other by a small gap of selected size d=0.03–0.2 mm. The input layer 15 is preferably flexible and contains a first sequence of closely spaced, electrically resistive lines 15-$k1$ (k1=1, 2, . . . , K1) that do not cross one another and that extend from the first electrode 13-1 to a floating or no-current (NC) terminal through which no current can flow. The resistive lines 15-$k1$ may be, but need not be, straight line segments that are parallel to each other. The input layer 16 contains a second sequence of closely spaced, electrically resistive lines 16-$k2$ (k2=1, 2, . . . , K2) that do not cross one another and that extend from the second electrode 13-2 to a floating or no-current (NC) terminal through which no current can flow. The resistive lines 16-$k2$ may be, but need not be, straight line segments that are parallel to each other. Each resistive line 15-$k1$ has the same selected resistance value Rx, and each resistive line 16-$k2$ as the same resistance value Ry, where Rx and Ry are independently chosen. The lengths of the resistive lines 15-$k1$ and 16-$k2$ are selected lengths, Lx and Ly, respectively, in the appropriate length units. The first voltage source 13-1 is connected to the group of resistive lines 15-$k1$ by a first resistor having a selected resistance value R1. The second voltage source 13-2 is connected to the group of resistive lines 16-$k2$ by a second resistor having a selected resistance value R2. Either or both of the selected resistance values, R1 and R2, can be 0. However, if R1=R2=0, the current from the voltage source 13-1 to the voltage source 13-2 may be more than can be tolerated (e.g., milliamps or higher). Preferably, at least one of the selected resistance values, R1 and R2, is in the kilo-ohm range or higher.

At least one resistive line 15-$k1$ and at least one resistive line 16-$k2$ make electrical contact with each other at an electrical contact point C (with as-yet unknown coordinates (x,y)), when a stylus, finger or other appendage is used to touch the screen at the contact point C. The voltage Vc at the contact point is measured, and the current i in one of the resistive line segments, r1 or r2, is measured. The resistance values r1 and r2 are determined by the relations $$V1-Vc=(R1+r1)\cdot i, \tag{1}$$

$$Vc-V2=(R2+r2)\cdot i, \tag{2}$$

or $$r1=(V1-Vc-R1\cdot i)/i, \tag{3}$$

$$r2=(Vc-V2-R2\cdot i)/i. \tag{4}$$

Note that either or both of the resistance values, R1 and R2, may be 0. This embodiment requires two measurements (Vc and i) and requires only three wires, for example, connected to V1, to V2 and to a voltage sensor for the contact point voltage Vc.

Figure 3:
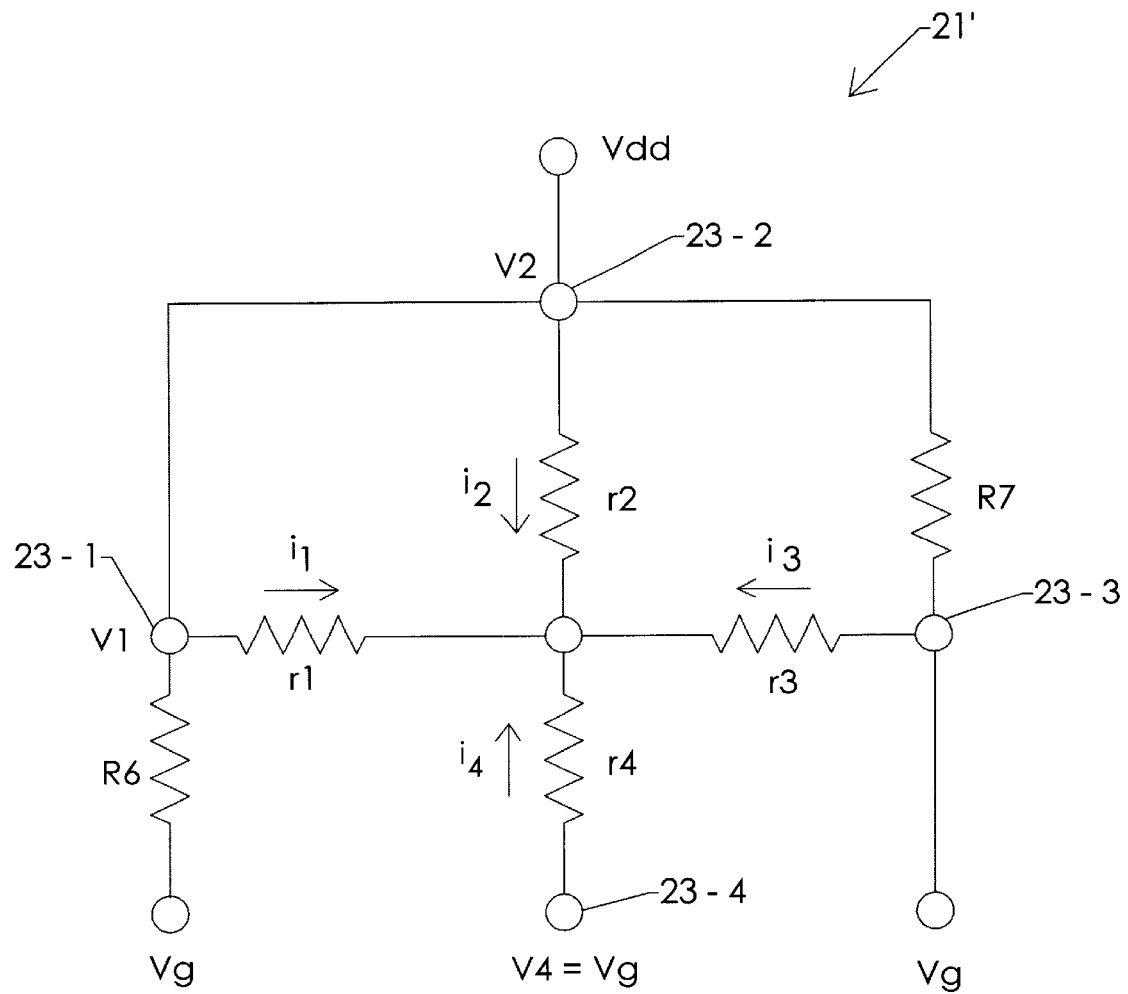

FIG. 3 schematically illustrates components of an input screen system 21' suitable for practising the invention. The system 21 illustrated in FIG. 3 includes four electrodes, 23-j (j=1, 2, 3, 4), maintained at selected voltages Vj, where it is assumed without loss of generality that V1>V3 and that V2>V4 so that the cross-panel voltages V1−V3 and V2−V4 are non-zero. The system 21 also includes two input layers, 25 (upper) and 26 (lower), parallel and separated from each other by a small gap of selected size d=0.03–0.2 mm. The upper input layer is preferably flexible and contains a first sequence of closely spaced, electrically resistive lines 25-$k1$ (k1=1, 2, . . . , K1) that do not cross one another and that extend from the first electrode 23-1 to the third electrode 23-3. The resistive lines 25-$k1$ may be, but need not be, straight line segments that are parallel to each other. The lower input layer contains a second sequence of closely spaced, electrically resistive lines 26-$k2$ (k2=1, 2, . . . , K2) that do not cross one another and that extend from the second electrode 23-2 to the fourth electrode 23-4. The resistive lines 26-$k2$ may be, but need not be, straight line segments that are parallel to each other. Each resistive line 25-$k1$ has the same selected resistance value Rx, and each resistive line 26-$k2$ as the same resistance value Ry. The lengths of the resistive lines 25-$k1$ and 26-$k2$ are selected lengths, Lx and Ly, respectively, in the appropriate length units.

Voltages for the two electrodes, 23-1 and 23-2, are preferably taken from a single voltage line connected to a voltage source 27 that provides a voltage $V5 \geq \max\{V1, V2, V3, V4\}$. A line carrying the voltage V5 is optionally received by a voltage step-down mechanism 29, such as a simple resistor step-down ladder, that provides one, two, three or four voltage output terminals having the line voltages V1, V2, V3 and V4. If, for example, the voltages V3 and V4 are both at ground voltage, which is supplied elsewhere, and $V1=V2=V_{dd}$, the voltage step-down mechanism may be eliminated and the choice V5=V1=V2 is preferred, equivalent to a single voltage output terminal.

At least one resistive line 25-$k1$ and at least one resistive line 26-$k2$ make electrical contact with each other at an electrical contact point C (with as-yet unknown coordinates (x,y)), when a stylus, finger or other appendage is used to touch the screen at the contact point C. Four resistive line segments beginning at the contact point C and ending at the first, second, third and fourth electrodes 23-j have the respective resistances, r1, r2, r3 and r4, as shown. These four resistive line segments have associated currents i1, i2, i3 and i4. For the configuration shown in FIGS. 2 and 3, the defining equations are developed in an Appendix.

In one approach, the voltage Vc at the contact point and one selected current, for example, i3 or i4, are measured, and the remaining unknown quantities are determined as follows.

$$i1=i2(i3\cdot Rx+V1)/(i4\cdot Ry+V1)=Num/Denom, \tag{A24}$$

$$Num=-i4(i3+i4)(i3\cdot Rx+V1)(Vc+i3\cdot Ry), \tag{A25}$$

$$Denom=\{(i3+i4)Vc+i3\cdot i4(Rx+Ry)\}(i4\cdot Ry+V1), \tag{A26}$$

$$i2=-i4(i3+i4)(Vc+i3\cdot Ry)/\{(i3+i4)Vc+i3\cdot i4(Rx+Ry), \tag{A23}$$

$$i4(i3 \cdot Rx+V1)(i3 \cdot Ry+Vc)-i4(i4 \cdot Ry+V1)(i3 \cdot Ry+Vc)-(i3 \cdot Rx+V1)\{(i3+i4)Vc+i3 \cdot i4(Rx+Ry)\}=0, \quad (A29)$$

where these relations correspond to the equation numbers i the Appendix.

The resistances r1 and r2 are then determined by $$r1(13,15)=i2(i3 \cdot Rx-i4 \cdot Ry)/(i1+i2)(i1+i3), \quad (A16)$$

$$r2(13,15)=i1(i3Rx-i4Ry)/(i1+i2)(i1+i3), \quad (A17)$$

or by $$r1(14,16)=\{i2(i4 \cdot Ry+V1)-i4(i3 \cdot Rx+V1)\}/(i3+i1)(i3+i2), \quad (A18)$$

$$r2(14,16)=\{i1(i3 \cdot Rx+V1)-i3(i4 \cdot Ry+V1)\}/(i3+i1)(i3+i2). \quad (A19)$$

One current value is measured and two of the remaining three current values are calculated here, because Eq. (A21) provides the fourth current value.

Figure 4:
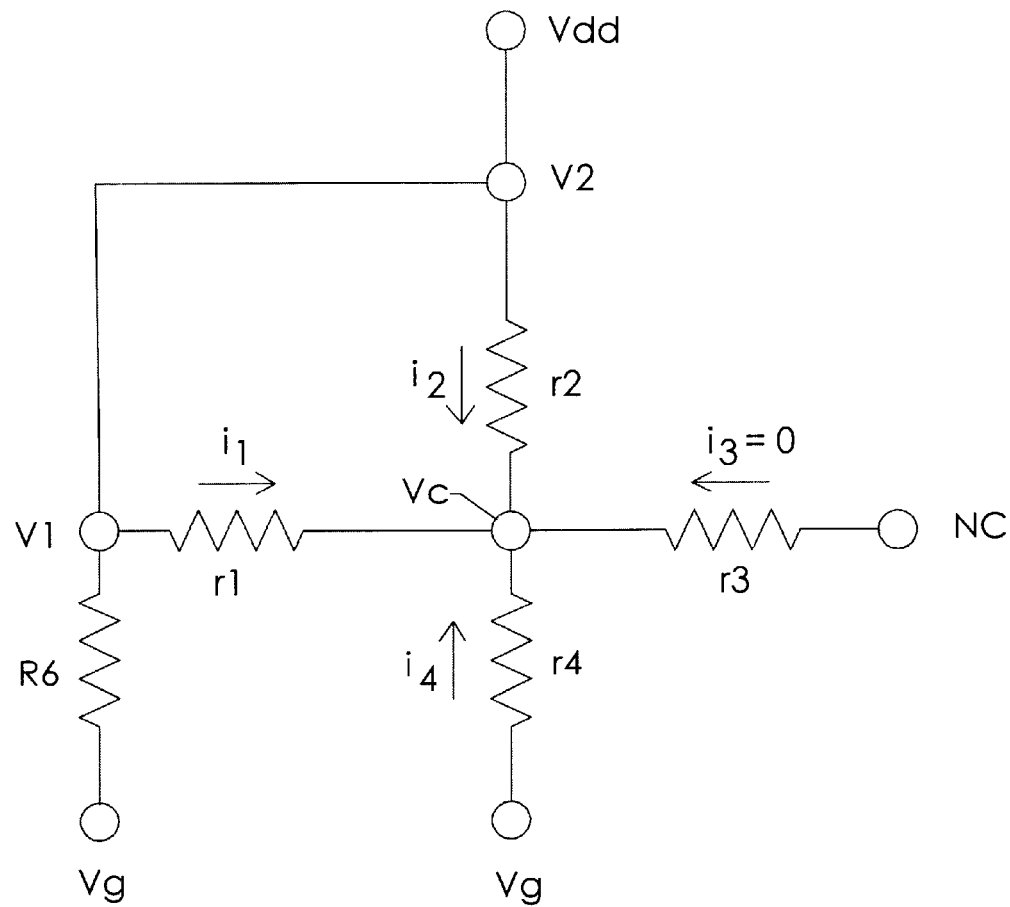

In a third embodiment, illustrated in FIG. 4, the voltage source V3 is floating and is a no-current (NC) source, where i3=0. The current i1 or the current i2 is measured, and the other of these currents is determined using Eq.(A36), Eq. (37) or Eq. (38) in the Appendix, and the current i4 is determined using Eq. (A30). The resistances r1, r2, r3 and r4, insofar as these are needed, are determined using Eqs. (A1), (A2), (A31) and (A32).

The resistive lines 15-k1 and 16-k2, and the resistive lines 25-k1 and 26-k2, are assumed to have uniformly distributed resistances per unit length and to have the respective lengths Lx and Ly. Assuming that the touch screen coordinates x and y are measured from an origin O located in the lower left corner of the first and second input layers, the screen coordinates are determined b the relations $$x=r1 \cdot Lx/Rx, \quad (5)$$

$$y=r2 \cdot Ly/R, \quad (6)$$

for the first embodiment, second embodiment and third embodiment.

Figure 5:
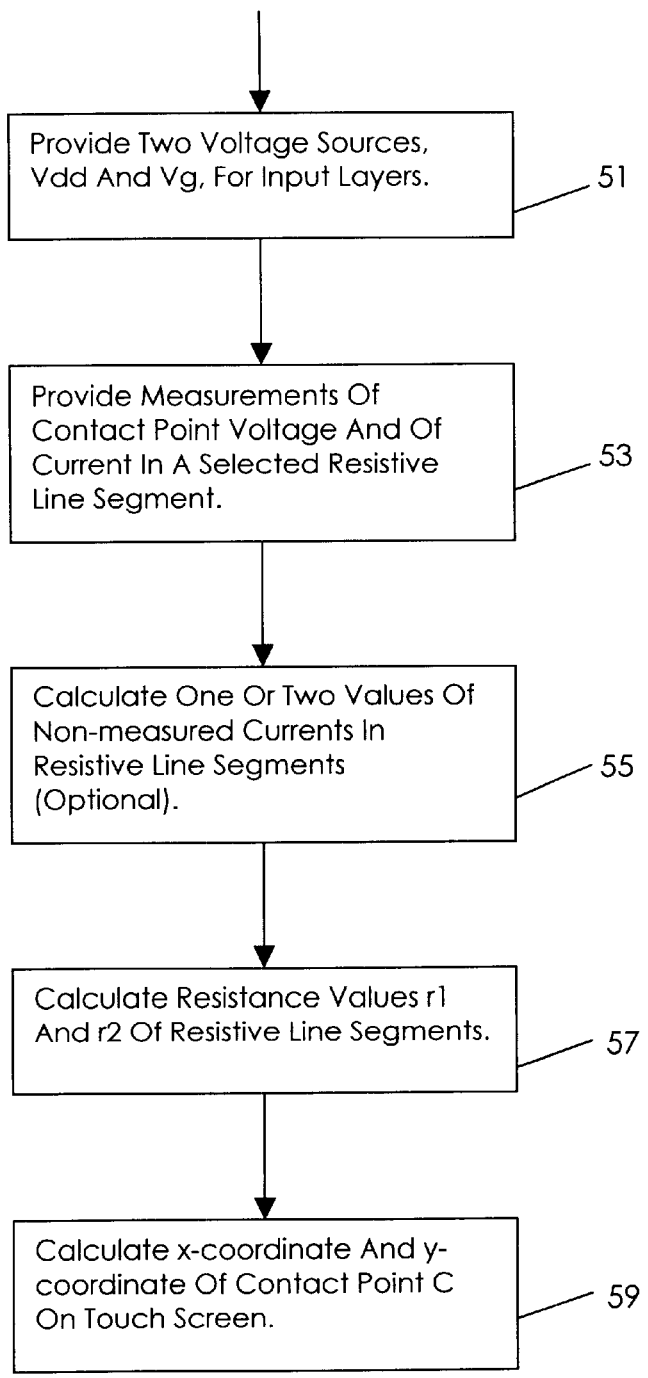
FIG. 5 is a flow chart for practising the invention.

FIG. 5 is a flow chart illustrating practice of the invention. In step 51, two voltage sources with selected voltages $V_{dd}$ and $V_g$ are provided for the input layers, with $V_g<V_{dd}$. In step 53, the system receives or provides measurements of the contact point voltage Vc and of a selected current in a selected resistive line segment. In step 55 (second embodiment only), at least two of the remaining three current values (second embodiment), or at least one of the remaining three current values (third embodiment), for the resistive line segment are calculated, using, for example, the analysis set forth in the Appendix. In step 57, the resistance values, r1 and r2, are calculated, using the current values and relations developed in the Appendix. In step 59, the (x,y) coordinates of the contact point C on the touch screen are calculated, using Eqs. (5) and (6).

In each embodiment, a contact voltage value Vc and a selected current value i are measured, using two voltage source wires and two measurement wires, where the voltage measurement wire and (optionally) the current measurement wire are not positioned between or adjacent to the first and second input layers. Thus, the first and second input layers have at most two wires, or at most three wires, positioned in the routing zone adjacent to the key area. The routing zone may thus be reduced in size (i.e., in width) and the key area may be correspondingly expanded.

Appendix

Figure 2:
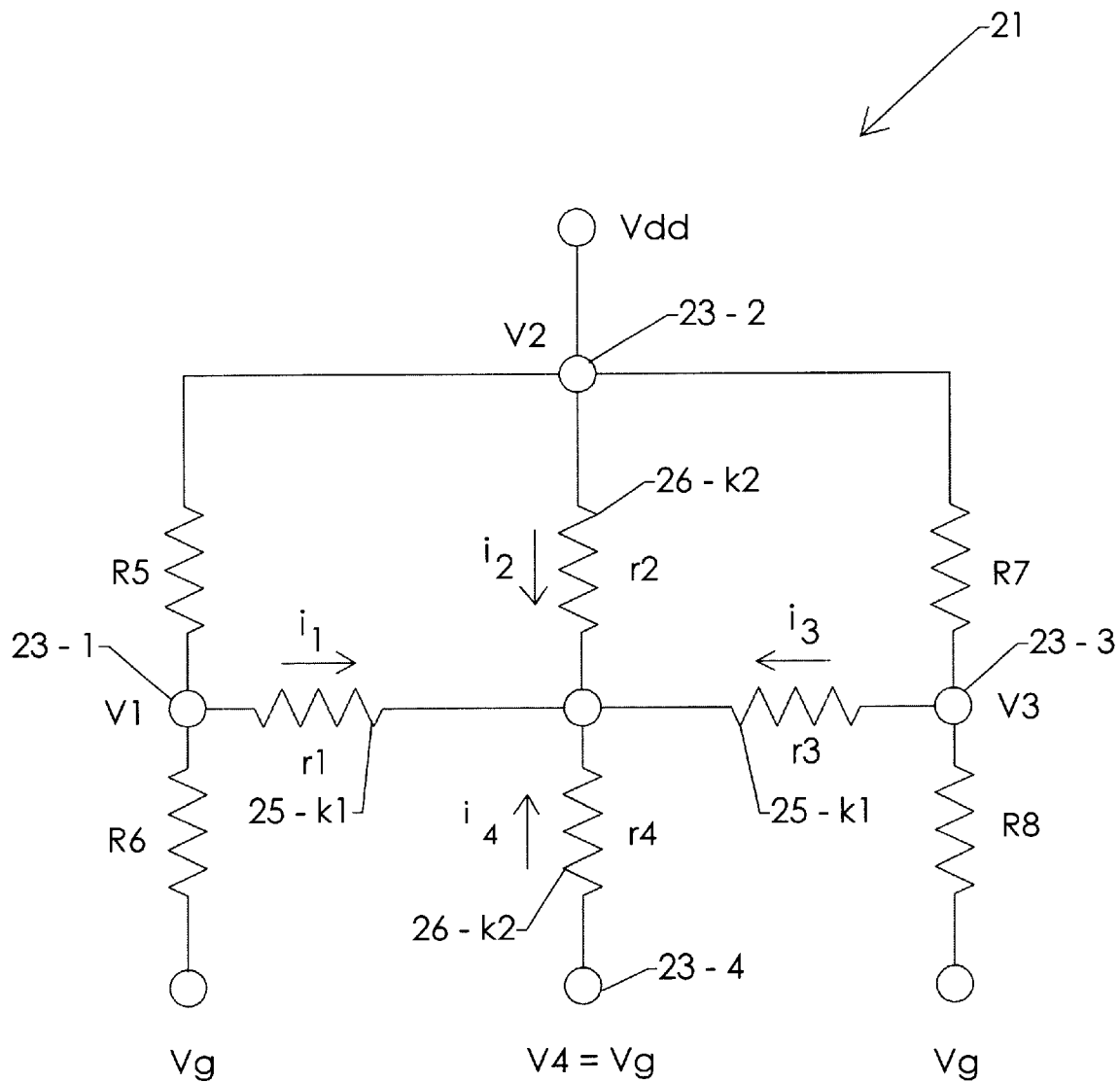

The network 21 illustrated in FIG. 2 includes four electrodes, 23-j (j=1, 2, 3, 4) with corresponding voltages Vj, where it is assumed without loss of generality that V1>V3 and that V2>V4 so that the cross-panel voltages V1−V3 and V2−V4 are non-zero. The network 21 also includes two input layers, 25 (upper) and 26 (lower), parallel and separated from each other by a small gap of selected size d=0.03–0.2 mm. The upper input layer is preferably flexible and contains a first sequence of closely spaced, electrically resistive lines 25-k1 (k1=1, 2, . . . , K1) that do not cross one another and that extend from the first electrode 23-1 to the third electrode 23-3. The resistive lines 25-k1 may be, but need not be, straight line segments that are parallel to each other. The lower input layer contains a second sequence of closely spaced, electrically resistive lines 26-k2 (k2=1, 2, . . . , K2) that do not cross one another and that extend from the second electrode 23-2 to the fourth electrode 23-4. The resistive lines 26-k2 may be, but need not be, straight line segments that are parallel to each other. Each resistive line 26-k1 has the same selected resistance value Rx, and each resistive line 26-k2 as the same resistance value Ry. The lengths of the resistive lines 25-k1 and 26-k2 are selected lengths, Lx and Ly, respectively, in the appropriate length units.

Voltages for the four electrodes 23-j are preferably taken from a single voltage line connected to a voltage source 17 that provides a voltage $V5=V_{dd} \geq \max\{V1, V2, V3, V4\}$. The voltage signal V5 is received directly at the electrode 23-2, passes through a resistor with resistance R5 and is received at the electrode 23-1, and passes through a resistor with resistance R7 and is received at the electrode 23-3. The electrode 23-1 is grounded ($V=V_g$) through a resistor with resistance R6, the electrode 23-3 is grounded through a resistor with resistance R8, and the electrode 23-4 grounded. Currents i5, i6, i7 and i8, whose values are to be determined, pass through the resistors with the respective resistances R5, R6, R7 and R8, with the direction conventions shown in FIG. 1.

The resistive lines 25-k1 and 26-k2, for particular values of k1 and k2, are pressed together and make contact at the contact point C on the respective input layers 25 and 26. The resistive line 25-k1 has a resistance value r1 between the electrode 23-1 and the contact point C and has a resistance value r3 between C and the electrode 23-3, where the sum $$r1+r3=Rx \quad (A1)$$

is known but the individual components, r1 and r3, are unknown. The resistive line 26-k2 has a resistance value r2 between the electrode 23-2 and C and has a resistance value r4 between C and the electrode 23-4, where the sum $$r2+r4=Ry \quad (A2)$$

is known but the individual components, r2 and r4, are unknown.

Applying the Kirchoff current node and voltage loop laws for the configuration shown in FIG. 1, the following equations are satisfied:

$$i1+i2+i3+i4=0, \quad (A3)$$

$$i5=i1+i6, \quad (A4)$$

$$i7=i3+i8, \quad (A5)$$

$$i5 \cdot R5+i6 \cdot R6=V_{dd}-V_g, \quad (A6)$$

$$i7 \cdot R7+i8 \cdot R8=V_{dd}-V_g, \quad (A7)$$

$$i2 \cdot r2-i4 \cdot r4=V2-V4=V_{dd}-V_g, \quad (A8)$$

$$i1 \cdot r1-i3 \cdot r3=V1-V3=V_{dd}-V_g, \quad (A9)$$

The voltages V2 and V4 are known but, in this configuration, the voltages V1 and V3 would be determined by the various currents and as-yet-unknown resistance values rj (j=1, 2, 3, 4). Where min (Rx, Ry) >>max(R5, R6, R7, R8), the voltages V1 and V3 may be approximated as $$V1(app)=(R6 \cdot V_{dd}-R5 \cdot V_g)/(R5+R6), \quad (A10)$$

$$V3(app)=(R8 \cdot V_{dd}-R7 \cdot V_g)/(R7+R8). \quad (A11)$$

The ground voltage value $V_g$ may be set at any value satisfying $V_g<V_{dd}$, if the source voltage value is replaced by $V_{dd}-V_g$ and each voltage Vj (j=1, 2, 3, 4) is replaced by $Vj-V_g$. For convenience, the value $V_g=0$ will be used here, but this is not required.

The resistance values R5 and R8 are assumed to be 0 here V4=$V_g$=0. This produces a network 21' illustrated in FIG. 3. The defining equations become $$i1 \cdot r1 - i2 \cdot r2 = 0, \quad (A12)$$

$$i2 \cdot r2 - i3(Rx-r1) = V1, \quad (A13)$$

$$i3(Rx-r1) - i4(Ry-r2) = 0, \quad (A14)$$

$$i1 \cdot r1 - i4(Ry-r2) = V1. \quad (A15)$$

Only three of the four equations (A12)–(A15) are independent. Equation (A14) is rearranged as $$i3 \cdot r1 - i4 \cdot r2 = i3 \cdot Rx - i4 \cdot Ry. \quad (A14')$$

Equations (A12) and (A14') have formal solutions $$r1(13,15)=i2(i3 \cdot Rx - i4 \cdot Ry)/(i1+i2)(i1+i3), \quad (A16)$$

$$r2(13,15)=i1(i3Rx - i4Ry)/(i1+i2)(i1+i3). \quad (A17)$$

Equations (A13) and (A15) are rearranged as $$i3 \cdot r1 + i2 \cdot r2 = i3 \cdot Rx + V1, \quad (A13')$$

$$i1 \cdot r1 + i4 \cdot r2 = i4 \cdot Ry + V1, \quad (A15')$$

which have formal solutions $$r1(14,16)=\{i2(i4 \cdot Ry+V1)-i4(i3 \cdot Rx+V1)\}/(i3+i1)(i3+i2), \quad (A18)$$

$$r2(14,16)=\{i1(i3 \cdot Rx+V1)-i3(i4 \cdot Ry+V1)\}/(i3+i1)(i3+i2). \quad (A19)$$

The formal solutions r1(12,14) and r1(13,15) should have equal values. After some analysis, this equality requires that $$i1(i3 \cdot Rx)+i2(i4 \cdot Ry)+V1(i1+i2)=0. \quad (A20)$$

Equality of r2(12, 14) and r2(13, 15) also leads to Eq. (20) so that no new information is obtained.

Equations (A3) and (A20) provide two expressions for the current i2 in terms of the other three currents:

$$i2=-(i1+i3+i4)=-i1(i3 \cdot Rx+V1)/(i4 \cdot Ry+V1). \quad (A21)$$

Using Eq. (A16), one verifies that $$i1 \cdot r3 = i3(Rx-r1) = -Vc = i3 \cdot Rx - (i2 \cdot i3)(i3 \cdot Rx - i4 \cdot Ry)/(i1+i2)(i1+i3) = -i3 \cdot i4(i1 \cdot Rx - i2 \cdot Ry)/(i1+i2)(i1+i3) = -i3i4(-(i2+i3+i4) \cdot Rx - i2Ry)/(i3+i4)(i2+i4), \quad (A22)$$

where Eq. (A21) as been applied in the numerator and in the denominator to remove explicit occurrence of the current i1. Equation (A17) yields the same result. Equation (A22) is rearranged to express the current i2 in terms of the currents i3 and i4:

$$i2=-i4(i3+i4)(Vc+i3 \cdot Ry)/\{(i3+i4)Vc+i3 \cdot i4(Rx+Ry)\}. \quad (A23)$$

Equation (A20) is rearranged to express the current i1 in terms of the currents i3 and i4:.

$$i1=i2(i3 \cdot Rx+V1)/(i4 \cdot Ry+V1)=Num/Denom, \quad (A24)$$

$$Num=-i4(i3+i4)(i3 \cdot Rx+V1)(Vc+i3 \cdot Ry), \quad (A25)$$

$$Denom=\{(i3+i4)Vc+i3 \cdot i4(Rx+Ry)\}(i4 \cdot Ry+V1). \quad (A26)$$

From Eqs. (A21) and (A23), one also verifies that $$i2=-(i1+i3+i4)=-(Num)/(Denom)-i3-i4=-i4(i3+i4)(Vc+i3 \cdot Ry)/\{(i3+i4)Vc+i3 \cdot i4(Rx+Ry)\}. \quad (A27)$$

Cancelling common terms in Eq. (A27) yields the relation $$\{(i3+i4)Vc+i3 \cdot i4(Rx+Ry)\}/(Vc+i3 \cdot Ry)+i4(i4 \cdot Ry+V1)/(i3 \cdot Rx+V1)=i4. \quad (A28)$$

At this point, one measures one of the current i3 and the current i4 and expresses the other of these two currents in terms of the measured current. Equation (A28) becomes a quadratic equation for the non-measured current (i3 or i4):

$$i4(i3 \cdot Rx+V1)(i3 \cdot Ry+Vc)-i4(i4 \cdot Ry+V1)(i3 \cdot Ry+Vc)-(i3 \cdot Rx+V1)\{(i3+i4)Vc+i3 \cdot i4(Rx+Ry)\}=0. \quad (A29)$$

With the currents i3 and i4 determined, the currents i1 and i2 are determined using, for example, Eqs. (A24) and (A23), respectively. The resistances r1 and r2 are determined using Eqs. (A16) and (A17), or Eqs. (A18) and (A19).

The network 41 in FIG. 4, illustrating a third embodiment, is identical to the network illustrated in FIG. 3, with one difference: the node corresponding to the voltage source V4 is now a no-current (NC) node (i3=0) so that the voltage V4 is floating. As before, the contact voltage Vc is measured. The resistances r1, r2, r3 and r4 again satisfy Eqs. (A1) and (A2) and the currents i1, i2 and i4 satisfy the relation $$i1+i2+i4=0. \quad (A30)$$

Equations (A12) and (A15) are valid and have the formal solutions $$r1=i2(V1+Ry \cdot i4)/\{i1(i2+i4)\} \quad (A31)$$

$$r2=i1(V1+Ry \cdot i4)/\{i1(i2+i4)\} \quad (A32)$$

One also verifies that $$-r4 \cdot i4=(r2-Ry)i4=V1-Vc, \quad (A33)$$

$$r1 \cdot i1=r2 \cdot i2=V1-Vc. \quad (A34)$$

Equations (A31), (A32) and (A34) require that $$i1 \cdot i2(V1-Ry \cdot i4)=(V1-Vc)i1(i2+i4), \quad (A35)$$

and Eq. (A30) is applied to rewrite (A35) as a polynomial equation in the currents i1 and i2:

$$(i1)^2\{V1-Vc-Ry \cdot i2\}+i1 \cdot i2(V1-Ry \cdot i2)=0, \quad (A36)$$

which provides a (non-zero) solution in terms of i1

$$i1=i2(V1-Ryi2)/\{V1-Vc-Ry \cdot i2\} \quad (A37)$$

and a solution in terms of i2

$$(i2)^2 i1 \cdot Ry - i2\{i1 \cdot V1-(i1)^2 Ry\}-(i1)^2(V1-Vc)=0. \quad (A38)$$

The current i1 or the current i2 (but not both) can be measured, along with the contact voltage Vc, and the remaining unknown currents among i1, i2 and i4 can be determined using Eqs. (A30) and (A36). Once the three currents are known, the resistances r1, r2, r3 and r4 can be determined using Eqs. (A1), (A2), (A31) and (A32).

What is claimed is:

1. A method for determining coordinates of a contact point on a touch screen that comprises first and second input layers, spaced apart by a selected small distance, each layer containing a sequence of resistive lines that extend between an input layer voltage source and a no-current-flow point, the method comprising:

providing a first selected voltage source, connected across a resistive line in the first input layer to an electrical contact point, common to the first input layer and the second input layer;

providing a second selected voltage source, connected in series across a selected resistance and a resistive line in the second input layer to the contact point;

measuring a current value for at least one resistive line that passes through the contact point;

measuring a voltage value at the contact point;

calculating a resistance of a resistive line that extends from the contact point to the first voltage source; and calculating a resistance of a resistive line that extends from the contact point to the second voltage source.

2. The method of claim 1, further comprising selecting said second voltage source to be a ground voltage.

3. The method of claim 1, further comprising measuring said current value for said resistive line lying in said first input layer.

4. The method of claim 1, further comprising measuring said current value for said resistive line lying in said second input layer.

5. A system for determining coordinates of a contact point on a touch screen that comprises first and second input layers, spaced apart by a selected small distance, each layer containing a sequence of resistive lines that extend between an input layer voltage source and a no-current-flow point, the system comprising:

a first selected voltage source, connected across a resistive line in the first input layer to an electrical contact point, common to the first input layer and the second input layer;

a second selected voltage source, connected in series across a selected resistance and a resistive line in the second input layer to the contact point;

a current measurement mechanism positioned to measure a current value for at least one resistive line that passes through the contact point;

a voltage measurement mechanism positioned to measure a voltage value at the contact point; and a computer that is programmed:
to receive the measured current value and the measured voltage value;
to calculate a resistance of a resistive line that extends from the contact point to the first voltage source; and
to calculate a resistance of a resistive line that extends from the contact point to the second voltage source.

6. The system of claim 5, wherein said second voltage source is a ground voltage.

7. The system of claim 5, wherein said current measurement mechanism measures said current value for said resistive line lying in said first input layer.

8. The system of claim 5, wherein said current measurement mechanism measures said current value for said resistive line lying in said second input layer.

9. A method for determining coordinates of a contact point on an input screen that comprises first and second input layers, spaced apart by a selected small distance, each layer containing a sequence of resistive lines that extend between first and second spaced apart electrodes for the input layer, the method comprising:

providing a first selected voltage for a first layer first electrode and for a second layer first electrode, and providing a second selected voltage for a first layer second electrode and for a second layer second electrode;

measuring a current value for at least one resistive line segment that extends from a contact point common to the first input layer and second input layer to the first layer first electrode;

calculating a current value for that least two resistive lines that extend from the contact point to the first layer second electrode, to the second layer first electrode, and to the second layer second electrode;

estimating a resistance value for the resistive line that extends from the contact point to at least one of the first layer first electrode and the first layer second electrode;

estimating a resistance value for the resistive line that extends from the contact point to at least one of the second layer first electrode and the second layer second electrode; and using the estimated resistance values to estimate coordinates corresponding to location of the contact point on at least one of the first and second input layers.

10. The method of claim 9, further comprising choosing said first and second electrode voltages to be different from each other.

11. The method of claim 10, further comprising choosing said third and fourth electrode voltages to be different from each other.

12. The method of claim 9, further comprising providing said first, second, third and fourth electrode voltages from one voltage source.

13. A method for determining coordinates of a contact point on an input screen that comprises first and second input layers, spaced apart by a selected small distance, each input layer containing a sequence of resistive lines that extend between two spaced apart electrodes for the input layer, the method comprising:

providing a first selected voltage and a second selected voltage for the first layer first electrode and first layer second electrode, and providing a third selected voltage and a fourth selected voltage for the second layer first electrode and second layer second electrode, respectively;

measuring a current value for each of at least first and second resistive lines that extend from a contact point common to the first input layer and second input layer to the first layer first electrode and to the first layer second electrode, respectively;

calculating a current value for two resistive lines that extend from the contact point to the second layer first electrode and to the second layer second electrode;

estimating a resistance value for the resistive line that extends from the contact point to at least one of the first layer first electrode and the first layer second electrode;

estimating a resistance value for the resistive line that extends from the contact point to at least one of the second layer first electrode and the second layer second electrode; and using the estimated resistance values to estimate coordinates corresponding to location of the contact point on at least one of the first and second input layers.

14. The method of claim 13, further comprising choosing said first and second electrode voltages to be different from each other.

15. The method of claim 14, further comprising choosing said third and fourth electrode voltages to be different from each other.

16. The method of claim 13, further comprising providing said first, second, third and fourth electrode voltages from one voltage source.

17. A method for determining coordinates of a contact point on an input screen that comprises first and second input layers, spaced apart by a selected small distance, each input layer containing a sequence of resistive lines that extend between two spaced apart electrodes for the input layer, the method comprising:

providing a first selected voltage and a second selected voltage for the first layer first electrode and first layer second electrode, and providing a third selected voltage and a fourth selected voltage for the second layer first electrode and second layer second electrode, respectively;

measuring a current value for each of at least first and second resistive lines that extend from a contact point common to the first input layer and second input layer to the first layer first electrode and to the second layer first electrode, respectively;

calculating a current value for two resistive lines that extend from the contact point to the first layer second electrode and to the second layer second electrode;

estimating a resistance value for the resistive line that extends from the contact point to at least one of the first layer first electrode and the first layer second electrode;

estimating a resistance value for the resistive line that extends from the contact point to at least one of the second layer first electrode and the second layer second electrode; and using the estimated resistance values to estimate coordinates corresponding to location of the contact point on at least one of the first and second input layers.

18. The method of claim 17, further comprising choosing said first and second electrode voltages to be different from each other.

19. The method of claim 18, further comprising choosing said third and fourth electrode voltages to be different from each other.

20. The method of claim 17, further comprising providing said first, second, third and fourth electrode voltages from one voltage source.

21. A method for determining coordinates of a contact point on an input screen that comprises first and second input layers, spaced apart by a selected small distance, each input layer containing a sequence of resistive lines that extend between two spaced apart electrodes for the input layer, the method comprising:

providing a first selected voltage and a second selected voltage for the first layer first electrode and first layer second electrode, and providing a third selected voltage and a fourth selected voltage for the second layer first electrode and second layer second electrode, respectively;

measuring a current value for each of at least first, second and third resistive lines that extend from a contact point common to the first input layer and second input layer to the first layer first electrode, to the first layer second electrode and to the second layer first electrode, respectively;

calculating a current value for two resistive lines that extend from the contact point to the first layer second electrode and to the second layer second electrode;

estimating a resistance value for the resistive line that extends from the contact point to at least one of the first layer first electrode and the first layer second electrode;

estimating a resistance value for the resistive line that extends from the contact point to at least one of the second layer first electrode and the second layer second electrode; and using the estimated resistance values to estimate coordinates corresponding to location of the contact point on at least one of the first and second input layers.

22. The method of claim 21, further comprising choosing said first and second electrode voltages to be different from each other.

23. The method of claim 22, further comprising choosing said third and fourth electrode voltages to be different from each other.

24. The method of claim 21, further comprising providing said first, second, third and fourth electrode voltages from one voltage source.

25. A method for determining coordinates of a contact point on an input screen that comprises first and second input layers, spaced apart by a selected small distance, each input layer containing a sequence of resistive lines that extend between a first electrode and a selected location in the input layer spaced apart from the first electrode, the method comprising:

providing a first selected voltage for a first layer first electrode and for a second layer first electrode, and providing a second selected voltage for a first layer second electrode;

measuring a current value for at least one resistive line segment that extends from a contact point common to the first input layer and the second input layer to a point drawn from the first layer first electrode, the first layer second electrode and the second layer first electrode;

calculating a current value for at least one resistive line, drawn from lines that extend from the contact point to the first layer first electrode, to the first layer second electrode, and to the second layer first electrode;

estimating a resistance value for the resistive line that extends from the contact point to at least one of the first layer first electrode and the first layer second electrode;

estimating a resistance value for the resistive line that extends from the contact point to at least one of the second layer first electrode and the second layer second electrode; and using the estimated resistance values to estimate coordinates corresponding to location of the contact point on at least one of the first and second input layers.

26. The method of claim 25, further comprising selecting said second voltage source to be a ground voltage.

27. The method of claim 25, further comprising measuring said current value for said resistive line lying in said first input layer.

28. The method of claim 25, further comprising measuring said current value for said resistive line lying in said second input layer.

* * * * *